(12) United States Patent
Rotem et al.

(10) Patent No.: US 10,191,742 B2
(45) Date of Patent: Jan. 29, 2019

(54) MECHANISM FOR SAVING AND RETRIEVING MICRO-ARCHITECTURE CONTEXT

(75) Inventors: Efraim Rotem, Haifa (IL); Eliezer Weissmann, Haifa (IL); Boris Ginzburg, Haifa (IL); Alon Naveh, Ramat Hasharon (IL); Nadav Shulman, Tel Mond (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 13/993,668

(22) PCT Filed: Mar. 30, 2012

(86) PCT No.: PCT/US2012/031568
§ 371 (c)(1),
(2), (4) Date: Jun. 12, 2013

(87) PCT Pub. No.: WO2013/147865
PCT Pub. Date: Oct. 3, 2013

(65) Prior Publication Data
US 2014/0325184 A1 Oct. 30, 2014

(51) Int. Cl.
*G06F 9/30* (2018.01)
*G06F 9/32* (2018.01)
(Continued)

(52) U.S. Cl.
CPC ........ *G06F 9/30083* (2013.01); *G06F 1/3243* (2013.01); *G06F 9/3836* (2013.01);
(Continued)

(58) Field of Classification Search
CPC .................................................. G06F 9/30083
See application file for complete search history.

(56) References Cited

U.S. PATENT DOCUMENTS 6,341,371 B1 * 1/2002 Tandri ..................... G06F 8/452
712/200
6,715,036 B1 * 3/2004 Burton ................ G06F 11/1008
711/112
(Continued)

FOREIGN PATENT DOCUMENTS

WO WO 2006/130825 12/2006

OTHER PUBLICATIONS

PCT International Search Report for PCT Counterpart Application No. PCT/US2012/031568, 3 pgs., (dated Nov. 26, 2012).
(Continued)

*Primary Examiner* — Benjamin P Geib
*Assistant Examiner* — William V Nguyen
(74) *Attorney, Agent, or Firm* — Nicholson De Vos Webster & Elliott, LLP

(57) ABSTRACT

A processor saves micro-architectural contexts to increase the efficiency of code execution and power management. Power management hardware during runtime monitors execution of a code block. The code block has been compiled to have a reserved space appended to one end of the code block. The reserved space includes a metadata block associated with the code block or an identifier of the metadata block. The hardware stores a micro-architectural context of the processor in the metadata block. The micro-architectural context includes performance data resulting from a first execution of the code block. The hardware reads the metadata block upon a second execution of the code block and tunes the second execution based on the performance data.

13 Claims, 13 Drawing Sheets

(51) Int. Cl.
*G06F 9/34* (2018.01)
*G06F 9/38* (2018.01)
*G06F 11/30* (2006.01)
*G06F 11/34* (2006.01)
*G06F 1/32* (2006.01)
*G06F 9/455* (2018.01)

(52) U.S. Cl.
CPC ........ *G06F 9/4552* (2013.01); *G06F 11/3409* (2013.01); *G06F 11/3062* (2013.01); *G06F 2201/865* (2013.01); *Y02D 10/152* (2018.01); *Y02D 10/34* (2018.01)

(56) References Cited

U.S. PATENT DOCUMENTS

| | | | |
|---|---|---|---|
| 7,730,459 B2 | 6/2010 | Gates et al. | |
| 2004/0078533 A1* | 4/2004 | Lee | G06F 11/1456 711/162 |
| 2005/0071834 A1 | 3/2005 | Gates et al. | |
| 2005/0155030 A1* | 7/2005 | DeWitt, Jr. | G06F 9/30094 717/168 |
| 2007/0067602 A1* | 3/2007 | Callister | G06F 12/1027 711/207 |
| 2007/0261038 A1* | 11/2007 | Suba | G06F 8/51 717/136 |
| 2007/0299810 A1 | 12/2007 | Riedel et al. | |
| 2009/0002157 A1 | 1/2009 | Donovan et al. | |
| 2009/0217277 A1* | 8/2009 | Johnson | G06F 1/3203 718/102 |
| 2013/0047166 A1* | 2/2013 | Penzes | H03K 3/0315 718/105 |

OTHER PUBLICATIONS

PCT Written Opinion of the International Searching Authority for PCT Counterpart Application No. PCT/US2012/031568, 4 pgs., (dated Nov. 26, 2012).
International Preliminary Report on Patentability for International Application No. PCT/US2012/031568, dated Oct. 1, 2014, 5 pages.

* cited by examiner

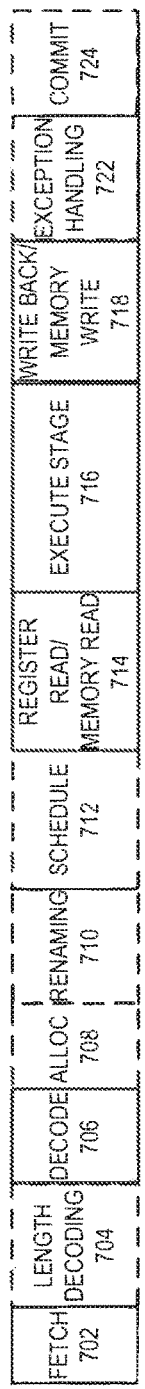
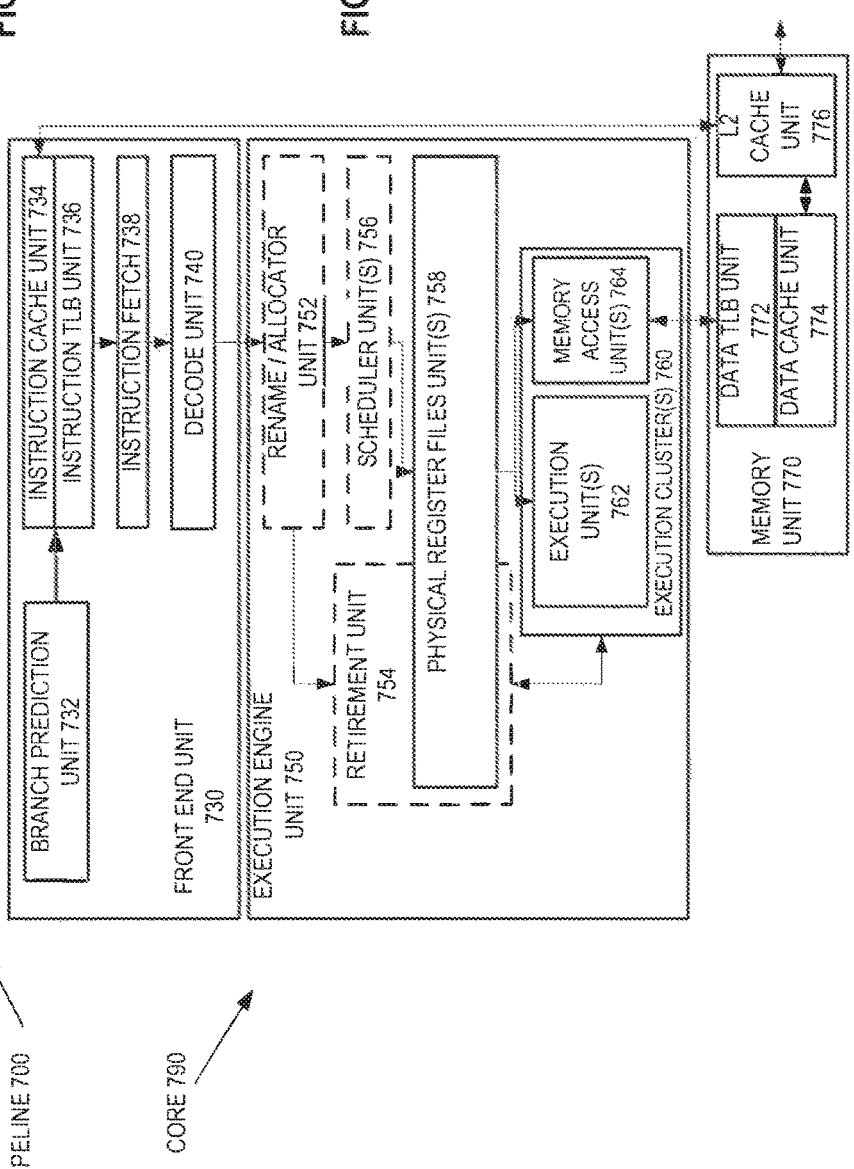

MECHANISM FOR SAVING AND RETRIEVING MICRO-ARCHITECTURE CONTEXT

CROSS-REFERENCE TO RELATED APPLICATION

This patent application is a U.S. National Phase Application under 35 U.S.C. § 371 of International Application No. PCT/US2012/031568, filed Mar. 30, 2012, entitled A MECHANISM FOR SAVING AND RETRIEVING MICRO-ARCHITECTURE CONTEXT.

TECHNICAL FIELD

The present disclosure pertains to the field of processing logic, microprocessors, and associated instruction set architecture that, when executed by the processor or other processing logic, perform logical, mathematical, or other functional operations.

BACKGROUND ART

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macroinstructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processors decoder decoding macroinstructions.

The ISA is distinguished from the micro-architecture, which is the internal design of the processor implementing the instruction set. Processors with different micro-architectures can share a common instruction set. For example, Intel® Core™ processors and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different micro-architectures using well-known techniques, including dedicated physical registers, one or more dynamically allocated physical registers using a register renaming mechanism (e.g., the size of a Register Alias Table (RAT), a Reorder Buffer (ROB) can be different for different processors), etc.

In conventional systems, the operation systems during a context switch save only the processor architectural states, but not the micro-architectural context. The architectural context generally includes contents of the architectural registers, which are visible to the software/programmer. The micro-architectural context includes contents of reorder buffers, retirement registers and performance monitoring counters, which are not visible to the software/programmer. The micro-architectural context contains performance data, such as power and energy usage data as well as other power management related parameters that can be used by the processor for power management. As a result, when a process or thread returns to execution, the processor needs to collect performance statistics from scratch. This results in inefficiency in processor operations during the initial period of a context switch.

Furthermore, most systems run power management control algorithms to manage power usage. These algorithms are typically based on the history of workload execution, under the assumption that the recent workload history is a good predictor to its behavior in the near future. However, when the workload execution enters a new phase, the recent past is no longer a good predictor. Additionally, when the workload execution enters a new phase, the micro-architectural context can be lost, which results in the power management control algorithms being unable to utilize the valuable performance data that can be obtained or derived from the micro-architectural context.

BRIEF DESCRIPTION OF THE DRAWINGS

Embodiments are illustrated by way of example and not limitation in the Figures of the accompanying drawings:

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments described herein provide a mechanism for saving micro-architectural contexts. The micro-architectural context includes performance data, which is collected by the processor during runtime. The performance data or an identifier of the performance data is then embedded into code blocks. The performance data can be used for power management and for tuning the code execution.

Embodiments described herein reduce the time it takes to collect execution history such that power and performance-control can be managed more efficiently. The execution history of a code block can be used to predict the power and performance efficiency before the actual execution of the code block. The range of execution history may be correlated to the accuracy of the prediction of system's behavior. That is, when the range of execution history increases, the accuracy of the prediction also improves.

Embodiments described herein detect a change in the execution condition and tie the stored performance data to a specific execution condition. Changes in the execution conditions can occur, for example, when an application takes a different execution path for a new functionality, when an application receives a new data set that has different cache residency characteristics, when the operating system (OS) schedules a new thread, when an application is rescheduled on a different core for execution, etc. The ability to tie the performance data to a specific condition can provide valuable information to power management as well as system and application developers.

Figure 1:
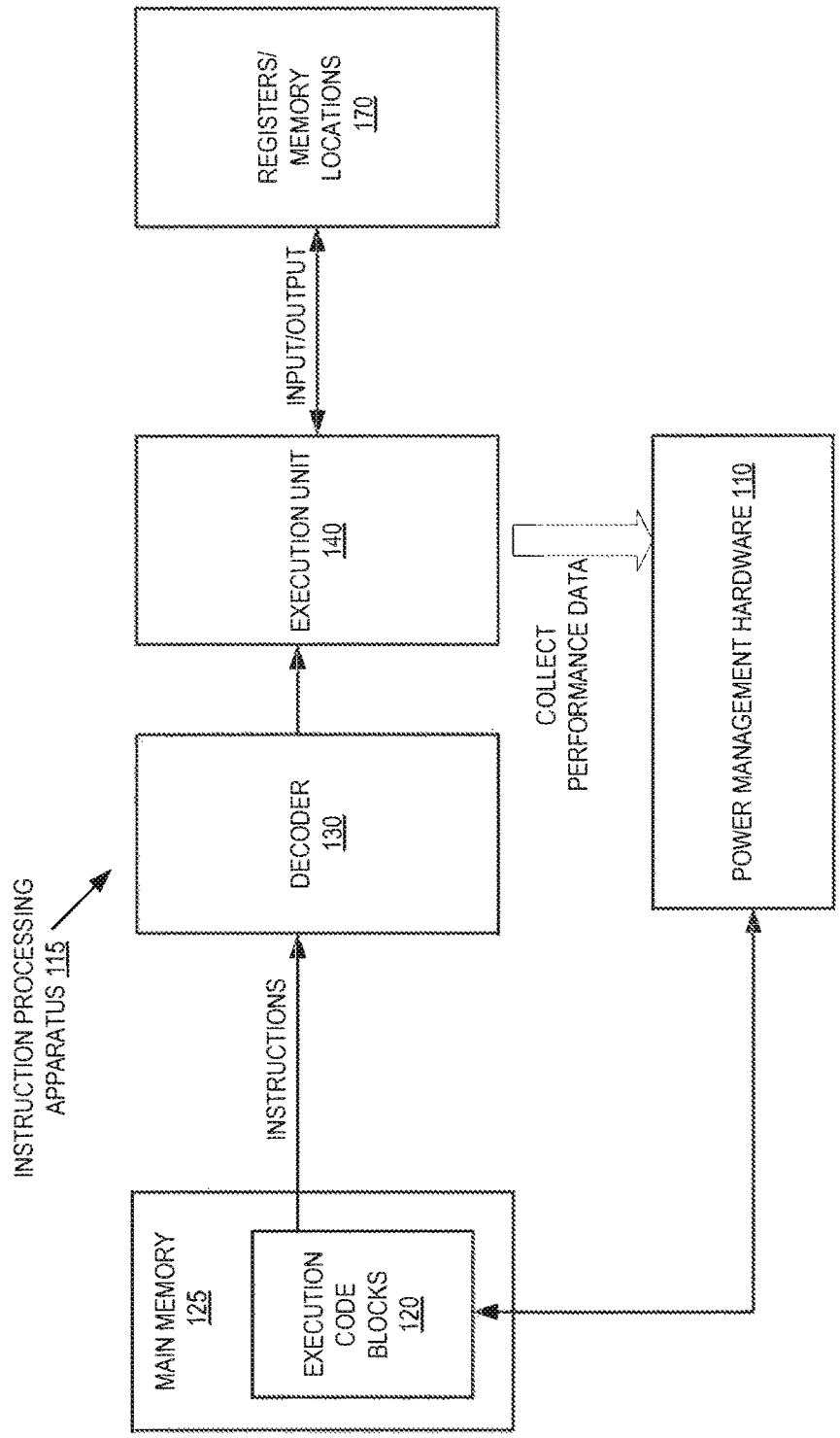
FIG. 1 is a block diagram of an example embodiment of an instruction processing apparatus having power management hardware according to one embodiment.

FIG. 1 is a block diagram of an embodiment of an instruction processing apparatus 115 having an execution unit 140 operable to execute instructions. In some embodiments, the instruction processing apparatus 115 may be a processor, a processing core of a multi-core processor, or a processing element in an electronic system.

A decoder 130 receives incoming instructions in the form of higher-level machine instructions or microinstructions, and decodes them to generate lower-level micro-operations, micro-code entry points, microinstructions, or other lower-level instructions or control signals, which reflect and/or are derived from the original higher-level instruction. The lower-level, instructions or control signals may implement the operation of the higher-level instruction through lower-level (e.g., circuit-level or hardware-level) operations. The decoder 130 may be implemented using various different mechanisms. Examples of suitable mechanisms include, but are not limited to, microcode, look-up tables, hardware implementations, programmable logic arrays (PLAs), other mechanisms used to implement decoders known in the art, etc.

The execution unit 140 is coupled to the decoder 130. The execution unit 140 may receive from the decoder 130 one or more micro-operations, micro-code entry points, microinstructions, other instructions, or other control signals, which reflect, or are derived from the received instructions. The execution unit 140 also receives input from and generates output to registers or memory locations 170.

To avoid obscuring the description, a relatively simple instruction processing apparatus 115 has been shown and described. It is to be appreciated that other embodiments may have more than one execution unit. For example, the apparatus 115 may include multiple different types of execution units, such as, for example, arithmetic units, arithmetic logic units (ALUs), integer units, floating point units, etc. Still other embodiments of instruction processing apparatus or processors may have multiple cores, logical processors, or execution engines. A number of embodiments of the instruction processing apparatus 115 will be provided later with respect to FIGS. 7-13.

According to one embodiment, the instruction processing apparatus 115 includes a power management hardware 110 to manage power usage. In one embodiment, the power management hardware 110 is part of a power control unit (PCU) (not shown) in a processor.

In a scenario where the instruction processing apparatus 115 is a multi-core processor, each processor core can include the power management hardware 110. As the apparatus 115 receives a stream of binary instructions, the power management hardware 110 monitors the execution of the instructions to collect performance data. In one embodiment, the performance data is part of the micro-architectural context. In one embodiment, the power management hardware 110 can identify the appropriate code and select the appropriate context to collect performance data based on need. The power management hardware 110 or the operating system can assign a unique ID for each execution flow.

In one embodiment, the power management hardware 110 saves the collected performance data in reserved locations. The performance data can be stored when the execution reaches the end of an execution code block 120, or when an application (i.e., the program that contains the execution code block) reaches one or more of the following changing conditions: switching to a different context, migrating a thread to a different processor core, receiving an input data set with different characteristics (e.g., different cache residency characteristics), taking a different execution path for a now functionality, etc. Thus, during the storing and restoring of the performance data as well the power data information instructions execution, the power management hardware 110 may request the PCU to fetch the relevant performance data that is monitored by the PCU, and save the fetched data.

The boundaries of each execution code block 120 are defined by conditional instructions; more specifically, there are no branches or jumps within an execution code block 120 except for its boundaries. Each time an execution code block 120 is executed, the power management hardware 110 can read the reserved space associated with the execution code block 120 to check if there is any previously-stored performance data. If there is, the power management hardware 110 determines whether the stored performance data can be used to aid the current code execution. In one embodiment, the stored performance data can be saved in a hard drive or non-volatile memory when the code execution terminates and the program containing the code exits, and can be retrieved when the program is restarted.

Generally, different parts of code can have different branch frequencies, positions of branch targets, amount of computations, etc. Therefore, their corresponding micro-architectural contexts (including the corresponding performance data) can also be different. In one embodiment, the power management hardware 110 saves the performance data for each thread and each execution condition (e.g., before a thread is migrated to a processor core, after a thread is migrated to a processor core, before an input data set changes its characteristics, after an input data set changes its characteristics, etc.). In one embodiment, the stored performance data is saved with respective condition identifiers that identity the threads associated with the performance data or the conditions in which the performance data is collected. Therefore, when an execution code block 120 is restarted for execution, the power management hardware 110 can retrieve the performance data for the specific thread or the specific execution condition for that execution code block.

Figure 2:
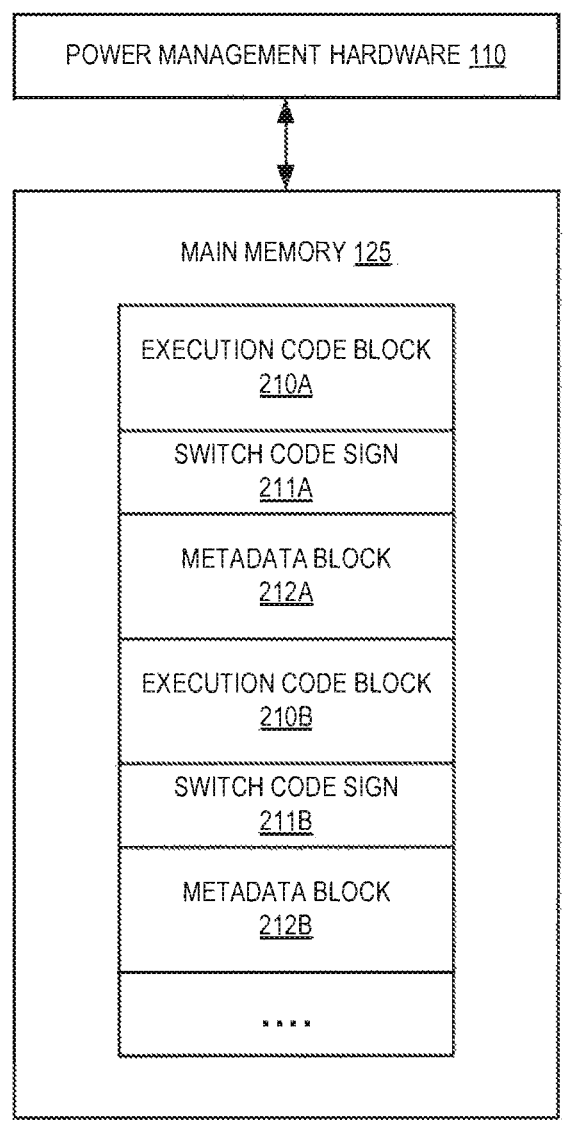
FIG. 2 illustrates an example of an arrangement of data blocks according to one embodiment.

FIG. 2 is a block diagram illustrating an example of an arrangement of execution code blocks 210A-B. In one embodiment, each execution code block 210A-B has been compiled to have a reserved space appended to one end of the code block. For example, the reserved space appended to the execution code block 210A includes a switch code sign 211A and a metadata block 212A. The switch code sign 211A may be a predetermined instruction or any binary code that signifies the end of an execution code block and the beginning of the reserved space. In one embodiment, a compiler may insert the switch code signs 211A-B and initialize the metadata blocks 212A-B to zero during compilation of the execution code blocks 210A-B.

At runtime, the power management hardware 110 can store the micro-architectural context into a metadata block associated with an execution code block, and can retrieve the stored data when the execution of the same code block is reached again. In the embodiment of FIG. 2, the execution code blocks 210A-B and their associated metadata blocks 212A-B are both stored in the system memory 125.

Figure 3:
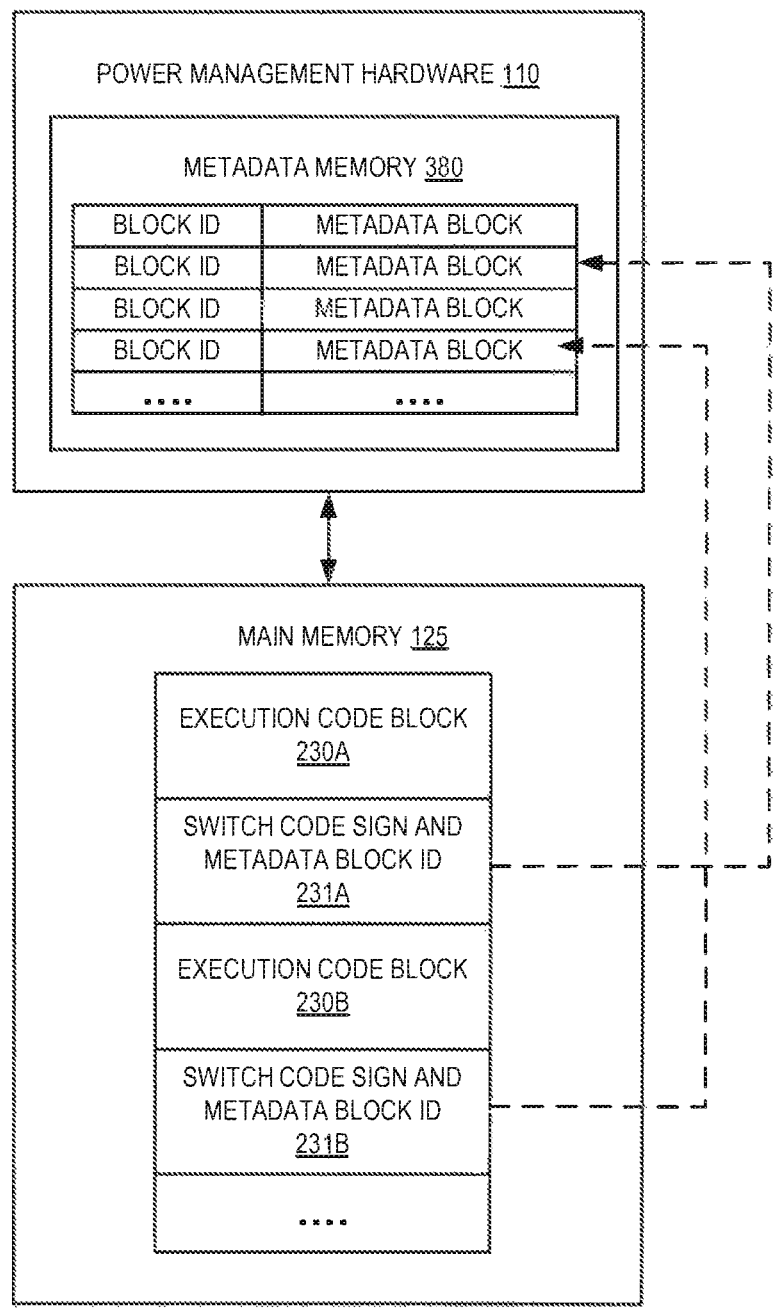
FIG. 3 illustrates an example of another arrangement of data blocks according to one embodiment.

FIG. 3 is a block diagram illustrating an example of another arrangement of execution code blocks 230A-B. In this embodiment, the execution code blocks 230A-B are stored in the system memory 125 while their associated metadata blocks 232A-B are stored in hardware; e.g., in metadata memory 380 within the power management hardware 110. For example, the reserved space appended to the end of the execution code block 230A includes a switch code sign and a metadata block identifier 231A. Using the metadata block identifiers as pointers, the power management hardware 110 is able to read from and write to the appropriate locations of the metadata memory 380, in which each metadata block (e.g., 232A or 232B) is indexed by its identifier. The metadata block identifiers can be allocated either by the power management hardware 110 or by the operating system. Each metadata block identifier uniquely identifies a metadata block.

In one embodiment, the metadata memory 380 provides a data space separate from the system memory space and behaves similarly to that of a processor last level cache (which is shared by all of the processors in the system). In one embodiment, the metadata memory 380 either holds power and performance data or may be used to hold the performance data only.

The metadata memory 380 may have limited storage space, e.g., a few kilobytes. In one embodiment, the power management hardware 110 may overwrite previously stored performance data when there is not enough space in the metadata memory 380 to store all of the collected data. For example, the power management hardware 110 may select the oldest data or least-recently-used (LRU) data to overwrite. In the embodiment shown in FIG. 2 where the metadata blocks are stored in the system memory 125, the power management hardware 110 may similarly overwrite previously stored performance data when there is not enough space reserved between the execution code blocks. Each metadata context includes an identification; e.g., a unique index such as the metadata block identifier 231A, which can be used to match between the current execution code to the saved metadata contexts.

Figure 4:
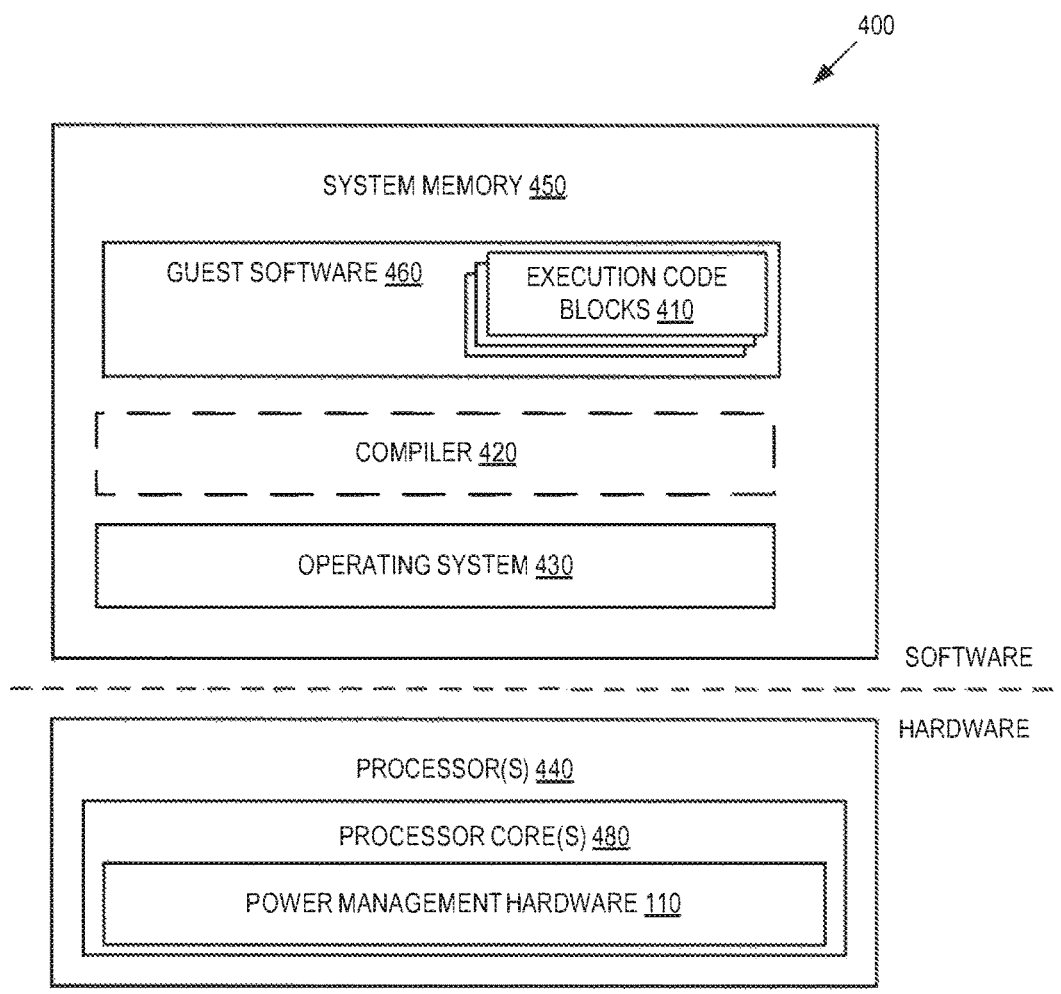
FIG. 4 illustrates elements of a system for power management according to one embodiment.

FIG. 4 illustrates elements of a power management system 400 according to one embodiment. As shown in FIG. 4, the power management system 400 includes a system memory 450 (also known as the main memory) to store software, and also includes hardware elements to support the software. The software may include guest software 460 (containing execution code blocks 410) and an OS 430. In one embodiment, the execution code blocks 410 are compiled with a compiler 420, which may reside m the system memory 450 or in the memory of a different system. The compiler 420 can be a static compiler or a just-in-time compiler. In some embodiments, the execution code blocks 410 may reside in any other software running on the OS 430 (including another OS running on a virtual machine that is managed by a virtual machine manager). In one embodiment, the execution code blocks 410 may be part of the OS 430.

The system 400 further includes hardware elements, such as one or more processors 440. One or more of the processors 440 may include multiple processor cores 480. Each processor core 480 includes the power management hardware 110 (of FIGS. 1-3). The power management hardware 110 includes logic to monitor execution of the code blocks 410, logic to store micro-architectural contexts (including performance data) resulting from the execution of the code blocks 410, logic to read the stored performance data, and logic to tune the execution based on the stored performance data.

In one embodiment, the processor cores 480 may have different performance; e.g., one processor core can handle higher intensity tasks than another processor core at the expense of higher energy consumption. The power management hardware 110 can at runtime choose an appropriate processor core to execute a given code block based on the stored performance data and the current execution condition. The power management hardware 110 can store the performance data of a code block executing on different processor cores in the metadata block associated with the code block. The stored performance data may be identified by condition identifiers that identify their respective processor cores on which the code block was executed. The power management hardware 110 may be able to predict the performance of executing the given code block on each processor core based on the stored performance data and the core's current workload status, to thereby determine a suitable processor core for executing the given code block.

Figure 5:
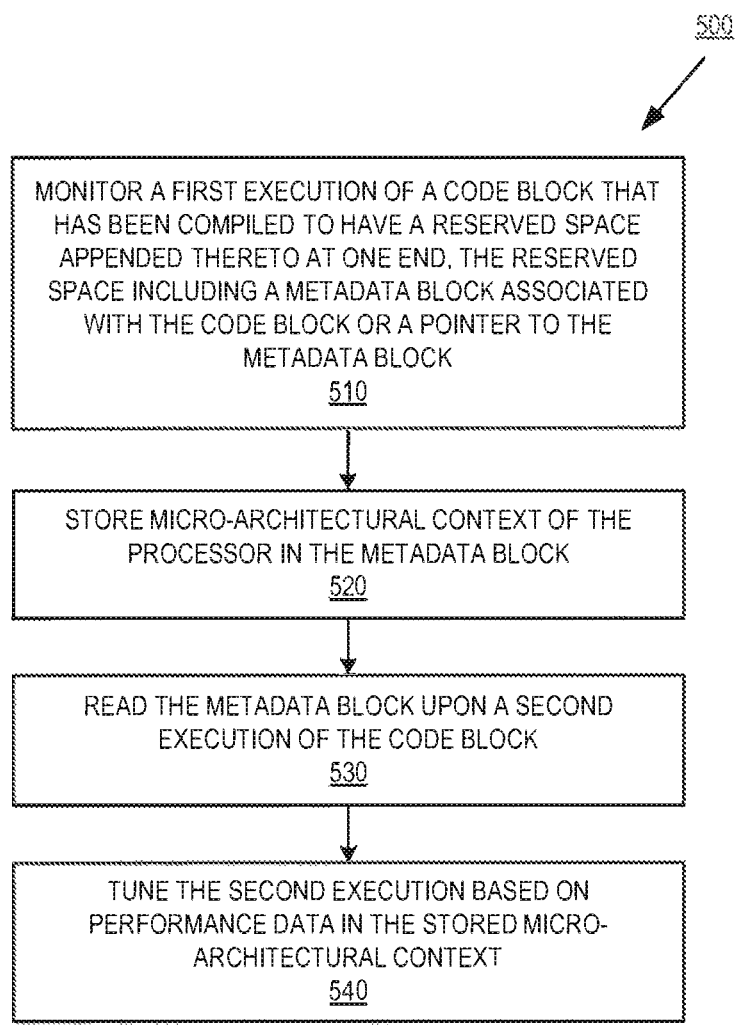
FIG. 5 is a flow diagram illustrating operations to be performed according to one embodiment.

FIG. 5 is a block flow diagram of an example embodiment of a method 500 for power management based on stored performance data. In various embodiments, the method 500 may be performed by a general-purpose processor, a special-purpose processor (e.g., a graphics processor or a digital signal processor), or another type of digital logic device or instruction processing apparatus. In some embodiments, the method 500 may be performed by the instruction processing apparatus 115 of FIG. 1, or a similar processor, apparatus, or system, such as the embodiments shown in FIGS. 7-13. Moreover, the instruction processing apparatus 115 of FIG. 1, as well as the processor, apparatus, or system shown in FIGS. 7-13 may perform embodiments of operations and methods either the same as, similar to, or different than those of the method 500 of FIG. 5.

The method 500 begins with hardware (e.g., the power management hardware 110 of FIGS. 1-3) during runtime monitoring a first execution of a code block (block 510). The code block has been compiled to have a reserved space appended to one end of the code block. The reserved space includes a metadata block associated with the code block or an identifier of the metadata block. The hardware stores a micro-architectural context of the processor in the metadata block (block 520). The micro-architectural context includes performance data resulting from the execution of the code block. The hardware reads the metadata block upon a second execution of the code block; for example, when the execution of the code block is restarted (block 530). Based on the performance data, the hardware tunes the second execution to thereby increase the efficiency of executing the code block (block 540).

In some embodiments, the instruction processing apparatus 115 of FIG. 1 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 6:
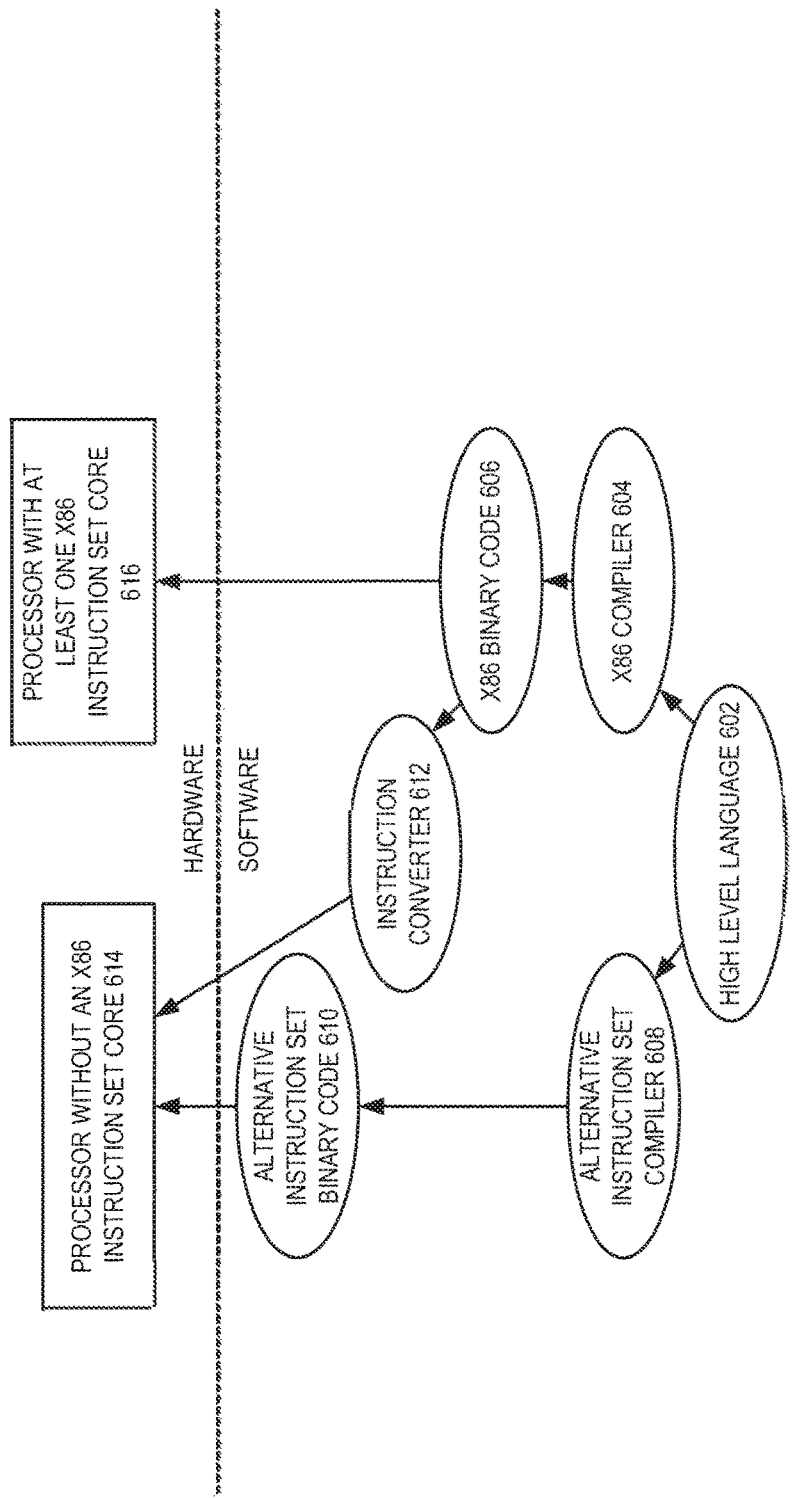
FIG. 6 is a block diagram illustrating the use of a software instruction converter to convert binary instructions in a source instruction set to binary instructions in a target instruction set according to one embodiment.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code-versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale. Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 700 including a front end unit 730 coupled to an execution engine unit 750, and both are coupled to a memory unit 770. The core 700 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside butter (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g. a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a lead unit, a store address unit, and a store data unit, each of which is coupled to the data TLB unit 772 in the memory unit 770. The instruction cache unit 734 is further coupled to a level 2 (L2) cache unit 770 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 750 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSL, AVX1, AVX2, etc), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Cure Architecture

Figure 8B:
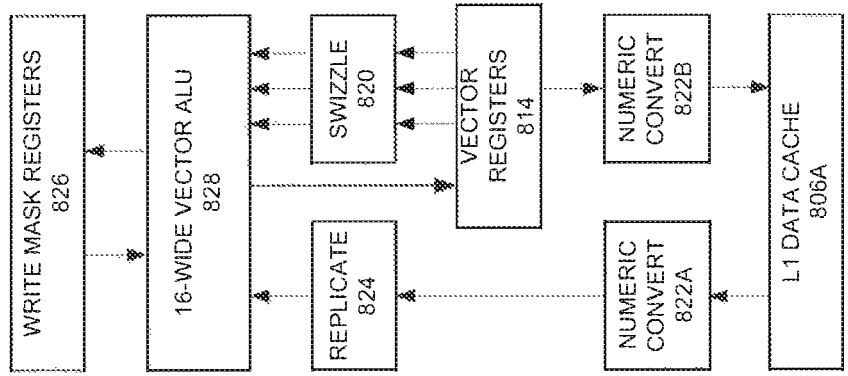
FIG. 8A-B are block diagrams of a more specific exemplary in-order core architecture according to one embodiment.
Figure 8A:
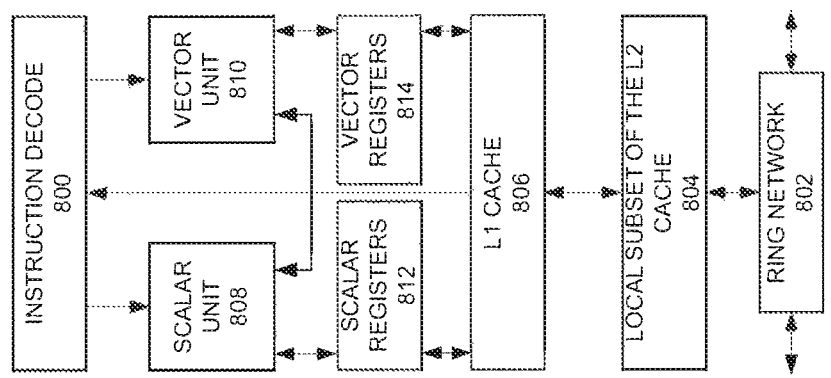

FIGS. 8A-B illustrate a block-diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interlaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network, ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
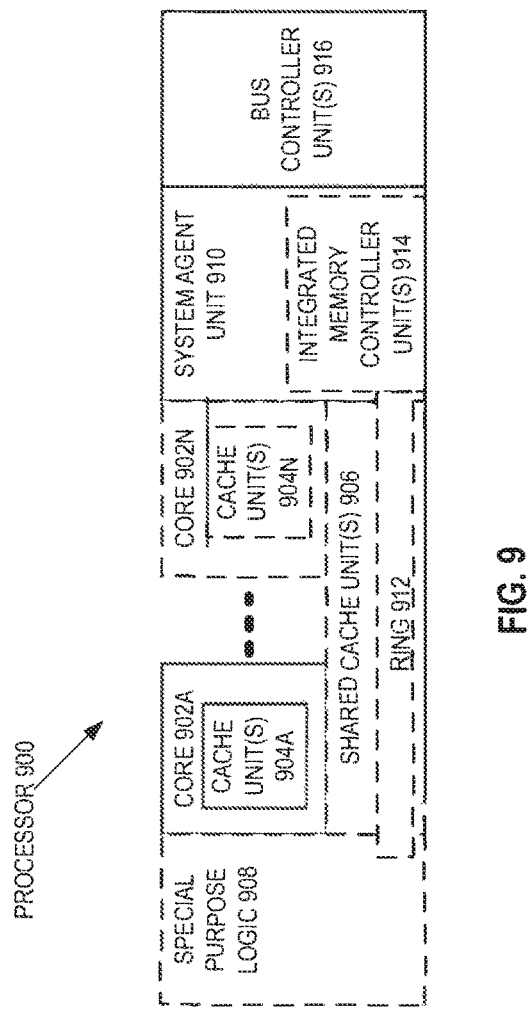
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
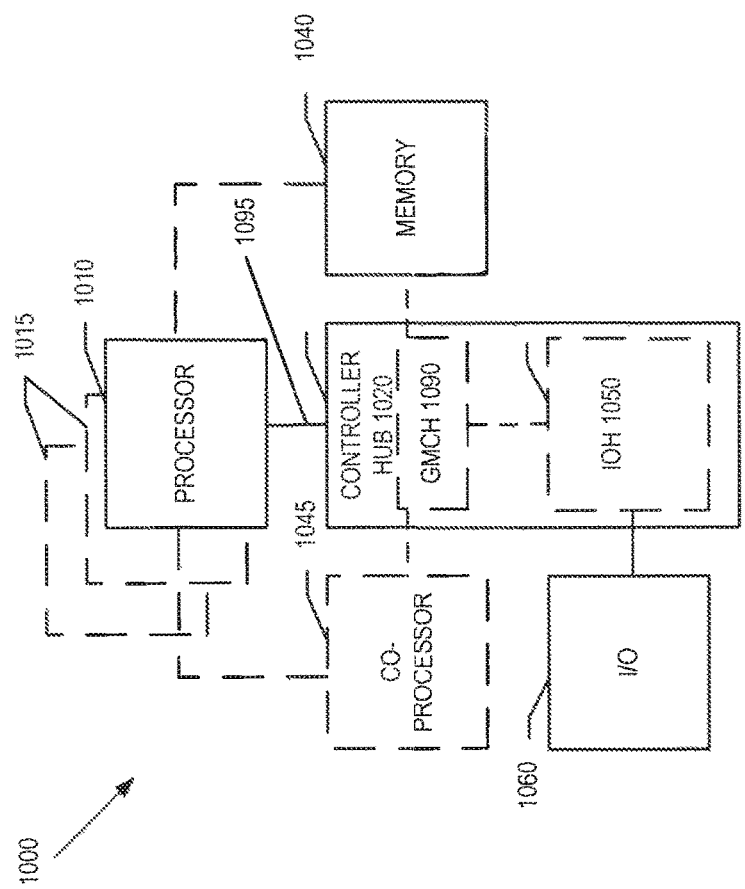
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiments the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network, or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
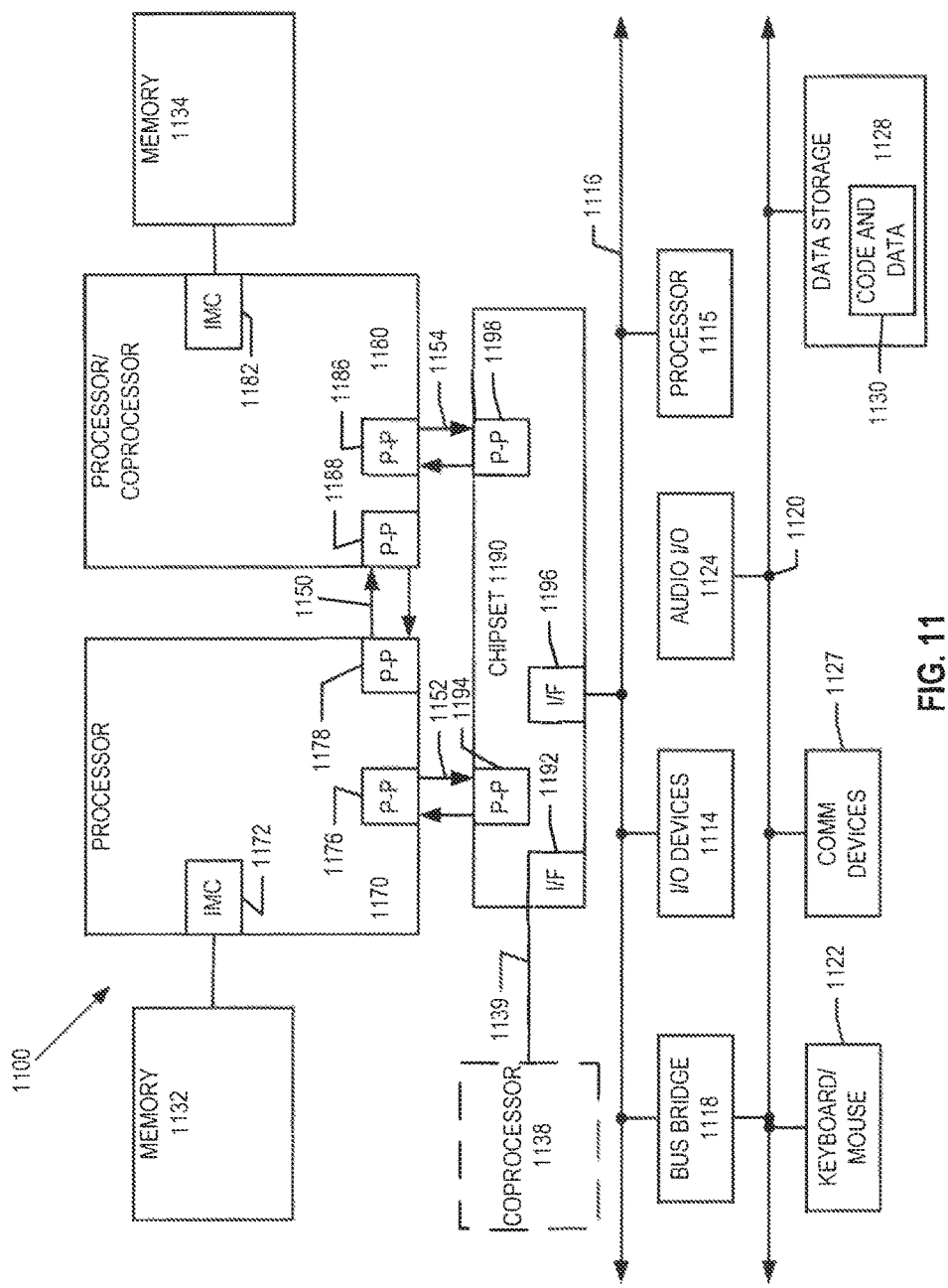
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interlaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first hits 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
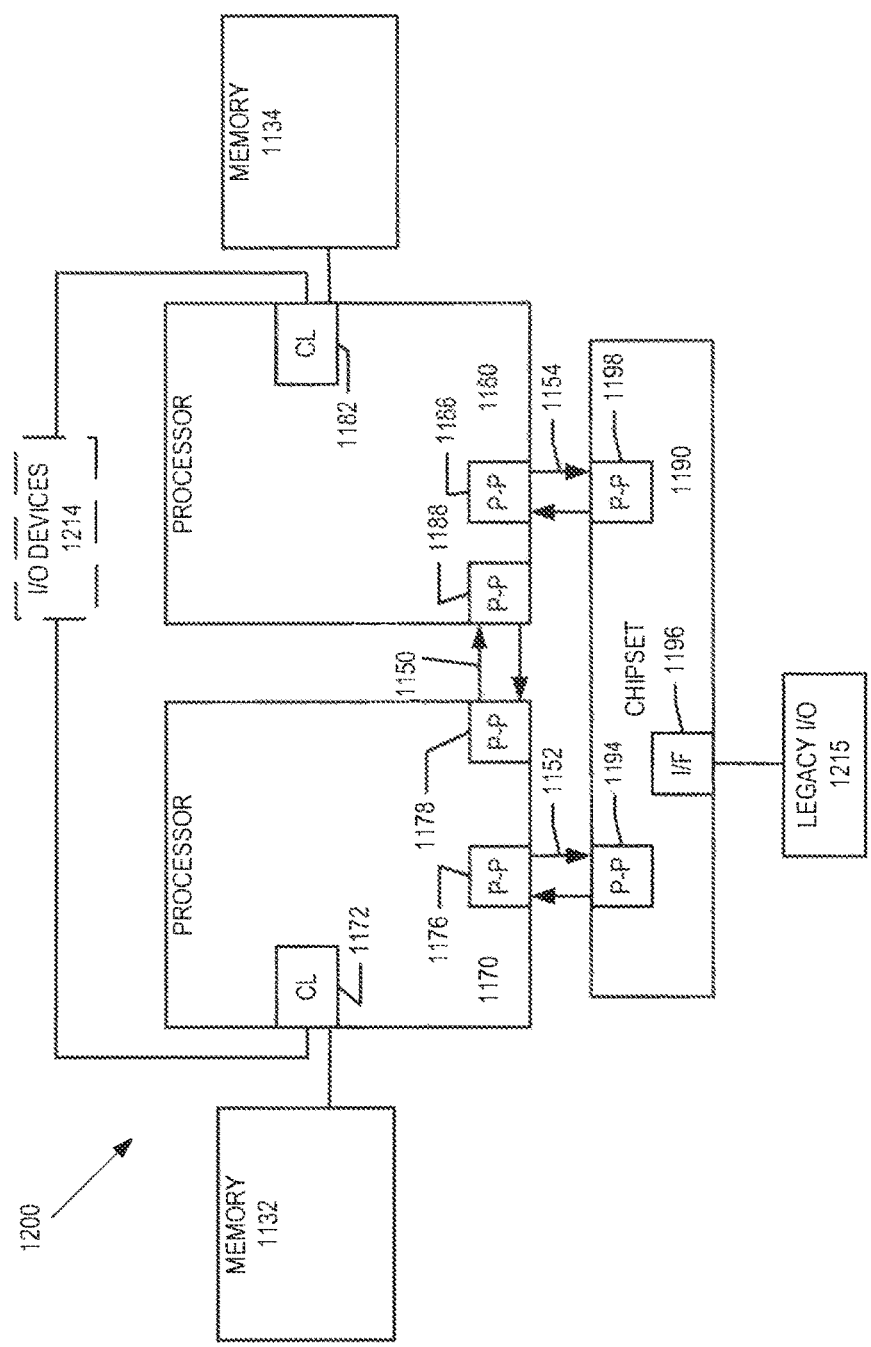
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
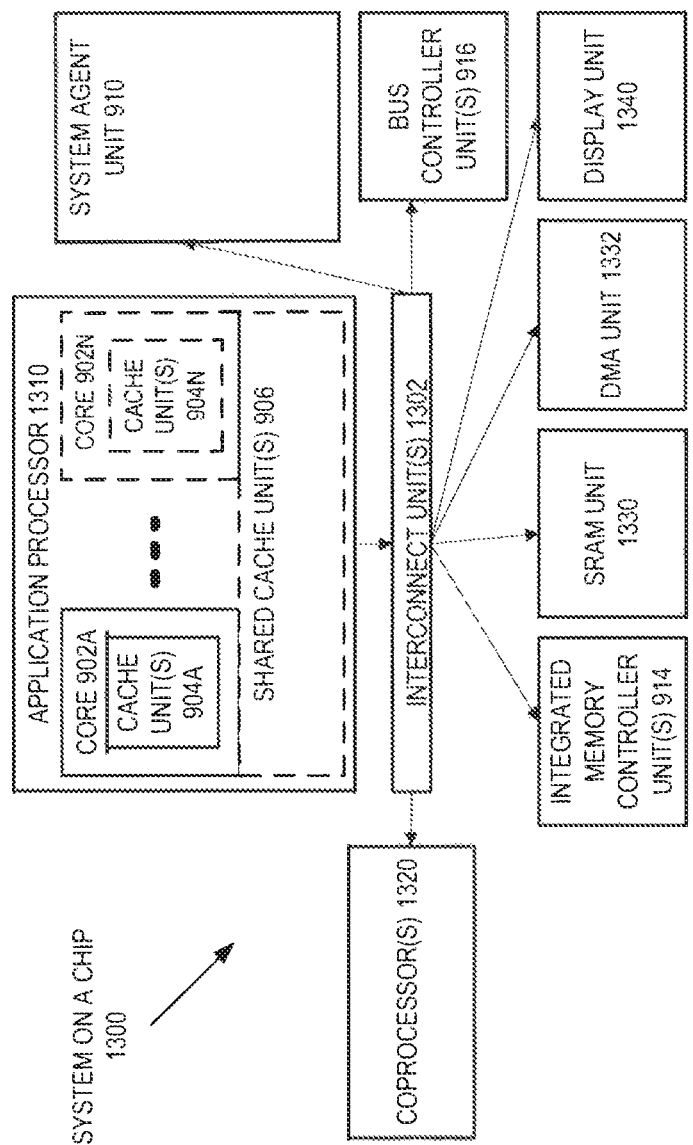
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements so FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein, may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known, as "IP cores" may be stored on a tangible, machine readable medium and supplied to various customers or manufacturing facilities to load into the lubrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    an execution unit within a processor to execute a code block having been compiled to have a reserved space appended to one end, the reserved space including a metadata block associated with the code block, and a switch code sign signifying an end of the code block and a beginning of the reserved space, wherein the code block and the reserved space appended to its end occupy a contiguous region of memory and boundaries of the code block are defined by conditional instructions;
    power management hardware coupled to the execution unit, wherein the power management hardware is to:
        monitor a first execution of the code block;
        store a micro-architectural context of the processor in the associated metadata block, the micro-architectural context including performance data resulting from the first execution of the code block, the performance data comprising power and energy usage data, and power management related parameters;
        read the associated metadata block upon a second execution of the code block; and
        tune the second execution based on the performance data stored in the associated metadata block to increase efficiency of executing the code block; and
    wherein the metadata block associated with the code block stores the performance data collected from executing the associated code block on two different processor cores that have different performances, and wherein the power management hardware is to determine which one of the two different processor cores is to execute the associated code block based on the performance data.

2. The apparatus of claim 1, wherein tuning the second execution based on the performance data to increase efficiency of executing the code block comprises choosing hardware resources within the execution unit to execute the code block.

3. The apparatus of claim 1, wherein the switch code sign comprises at least one of a predetermined instruction and a predetermined binary code.

4. The apparatus of claim 1, wherein the performance data is stored with a condition identifier that identifies a condition in which the performance data is collected.

5. A method comprising:
    monitoring, by power management hardware, a first execution of a plurality of code blocks in a processor, each of the plurality of code blocks having been compiled to have a reserved space, including a switch code sign signifying a memory boundary between the code block and the reserved space, appended to one end of the code block, wherein the code block and the reserved space appended to its end occupy a contiguous region of memory and boundaries of the code block are defined by conditional instructions, and wherein the reserved space includes a unique identifier of a metadata block stored in power management hardware;
    storing a micro-architectural context of the processor in the metadata block of each of the plurality of code blocks, the micro-architectural context containing performance data resulting from the first execution of the code block, the performance data comprising power and energy usage data, and power management related parameters;
    reading the metadata block of each of the plurality of code blocks upon a second execution of the code block; and
    tuning the second execution of each of the plurality of code blocks based on the performance data in the metadata block to increase power and performance efficiency of executing the code block; and
    wherein the metadata block associated with the code block stores the performance data collected from executing the associated code block on two different processor cores that have different performances, and wherein the power management hardware is to determine which one of the two different processor cores is to execute the associated code block based on the performance data.

6. The method of claim 5, further comprising:
    storing, for each of the plurality of code blocks, a copy of the identifier and its associated metadata block within the power management hardware.

7. The method of claim 5, wherein tuning the second execution of each of the plurality of code blocks comprises choosing hardware resources within the processor to execute the code block.

8. The method of claim 5, wherein tuning the second execution of each of the plurality of code blocks further comprises:

detecting a change to a new condition in which the code block is executed; and\
reading from the metadata block associated with the code block the performance data associated with a condition identifier that identifies the new condition.

9. The method of claim 5, wherein tuning the second execution of each of the plurality of code blocks further comprises:
   detecting a change to a new condition in which the code block is executed; and
   storing in the metadata block associated with the code block the performance data associated with a condition identifier that identifies the new condition.

10. The method of claim 5, wherein the performance data is stored when an application that contains the code block reaches at least one of the following changing conditions: switching to a different context, migrating a thread to a different processor core, receiving an input data set with different characteristics, and taking a different execution path for a new functionality.

11. A system comprising:
   input and output (I/O) devices; system memory coupled to the I/O devices,
   the system memory having stored thereon a code block that has been compiled to have a reserved space, including an identifier of a metadata block associated with the code block and a switch code sign signifying an end of the code block and a beginning of the reserved space, appended to one end of the code block, wherein the code block and the reserved space appended to its end occupy a contiguous region of memory and boundaries of the code block are defined by conditional instructions, and wherein the metadata block is stored in power management hardware memory;
   an execution unit within a processor to execute the code block; and power management hardware coupled to execution unit, wherein the power management hardware is to:
   monitor a first execution of the code block;
   store a micro-architectural context of the processor in the metadata block, the micro-architectural context including performance data resulting from the first execution of the code block, the performance data comprising power and energy usage data, and power management related parameters;
   read the metadata block upon a second execution of the code block; and tune the second execution by choosing hardware resources within the processor to execute the code block based on the performance data to increase power and performance efficiency of executing the code block; and
   wherein the metadata block associated with the code block stores the performance data collected from executing the associated code block on two different processor cores that have different performances, and wherein the power management hardware is to determine which one of the two different processor cores is to execute the associated code block based on the performance data.

12. The system of claim 11, wherein a copy of the identifier and the metadata block are stored within the power management hardware.

13. The system of claim 11, wherein the performance data is stored with a condition identifier that identifies a condition in which the performance data is collected.

* * * * *